(12) United States Patent
Kato et al.

(10) Patent No.: US 8,593,161 B2
(45) Date of Patent: Nov. 26, 2013

(54) CONTACT DETECTION APPARATUS AND PINCH PREVENTION APPARATUS

(75) Inventors: Masayuki Kato, Kanagawa (JP); Kazushi Hirose, Kanagawa (JP); Yoshihiro Fujimura, Osaka (JP); Minoru Tanaka, Osaka (JP); Takao Koba, Osaka (JP); Hiroki Nishida, Osaka (JP); Naoki Sumiya, Aichi (JP); Kenji Kato, Aichi (JP)

(73) Assignees: Shiroki Kogyo Co., Ltd., Kanagawa (JP); Tachibana Eletech Co., Ltd., Osaka (JP)

( * ) Notice: Subject to any disclaimer, the term of this patent is extended or adjusted under 35 U.S.C. 154(b) by 970 days.

(21) Appl. No.: 12/089,669

(22) PCT Filed: Oct. 11, 2006

(86) PCT No.: PCT/JP2006/320332
§ 371 (c)(1),
(2), (4) Date: Dec. 31, 2008

(87) PCT Pub. No.: WO2007/043584
PCT Pub. Date: Apr. 19, 2007

(65) Prior Publication Data
US 2009/0218978 A1    Sep. 3, 2009

(30) Foreign Application Priority Data
Oct. 13, 2005 (JP) ................. 2005-298853

(51) Int. Cl.
*G01R 27/26* (2006.01)

(52) U.S. Cl.
USPC ........... 324/661; 324/326; 324/658; 324/663; 324/679; 324/686; 73/780

(58) Field of Classification Search
USPC .............................................. 324/661; 73/780
See application file for complete search history.

(56) References Cited

U.S. PATENT DOCUMENTS

| | | | |
|---|---|---|---|
| 2001/0017587 A1* | 8/2001 | Suzuki et al. | 340/545.7 |
| 2005/0092097 A1* | 5/2005 | Shank et al. | 73/780 |
| 2005/0103117 A1* | 5/2005 | Ogino et al. | 73/756 |
| 2005/0179445 A1* | 8/2005 | Nakano et al. | 324/661 |

FOREIGN PATENT DOCUMENTS

| | | |
|---|---|---|
| JP | 2001-243847 | 9/2001 |
| JP | 2002-368597 | 12/2002 |
| JP | 2005-227244 | 8/2005 |

\* cited by examiner

*Primary Examiner* — Arleen M Vazquez
*Assistant Examiner* — Son Le
(74) *Attorney, Agent, or Firm* — Finnegan, Henderson, Farabow, Garrett & Dunner, L.L.P.

(57) ABSTRACT

A contact detection apparatus that allows faster detection and a pinch prevention apparatus equipped with such a detection apparatus are provided.
The contact detection apparatus includes a first electrode (430) made of a flexible conductive material and extending throughout a contact detection range, a second electrode (440) apart from the first electrode and extending on the back side of the first electrode, and detection means for detecting contact of an object with the first electrode based on the capacitance of the first electrode. The first electrode is made of a conductive resin containing an embedded conductor.

6 Claims, 19 Drawing Sheets

CONTACT DETECTION APPARATUS AND PINCH PREVENTION APPARATUS

TECHNICAL FIELD

The present invention relates to a contact detection apparatus and a pinch prevention apparatus, particularly to an apparatus that detects contact with an object and a pinch prevention apparatus that detects that two members, at least one of which is driven by a driver, pinch a foreign object and controls the driver to prevent the pinch.

BACKGROUND ART

A power window of a vehicle or the like is configured in such a way that a window regulator moves a pane back and forth between the positions where the window frame is open and closed. The window regulator is controlled to prevent the body or the like of a driver or a passenger from being pinched. As an example of such control, a detector provided in the vicinity of the window frame is used to prevent pinch based on a detection signal from the detector.

The detector includes an elastically flexible tube in which a pair of parallel electrodes are disposed in such a way they face each other with a gap therebetween. The detector detects pinch when the tube is crushed to cause a short circuit between the electrodes (see JP-A-61-45518, for example) or decrease in the distance between the electrodes and hence increase in capacitance (see JP-A-2000-329506, for example).
Patent Document 1: JP-A-61-45518
Patent Document 2: JP-A-2000-329506

DISCLOSURE OF THE INVENTION

Problems that the Invention is to Solve

The detector does not produce a detection signal until the tube is sufficiently crushed. There is therefore a delay in initiating the pinch prevention control after pinch occurs, so that the body or the like is kept severely pinched during the delay period.

An object of the invention is to provide a contact detection apparatus that allows faster detection. Another object of the invention is to provide a pinch prevention apparatus equipped with such a detection apparatus.

Means for Solving the Problems

A preferred embodiment of a contact detection apparatus is disclosed, characterized in that the apparatus includes a first electrode made of a flexible conductive material and extending throughout a contact detection range, a second electrode apart from the first electrode and extending on the back side of the first electrode, and detection means for detecting contact of an object with the first electrode based on the capacitance of the first electrode.

The first electrode may be made of a conductive resin containing an embedded conductor.

The embedded conductor may be located at the base of the first electrode.

The embedded conductor may be an embedded metal.

The detection means may detect the contact when the capacitance of the first electrode becomes greater than a predetermined threshold value.

The second electrode may have a capacitance greater than the threshold value.

The detection means may also detect the contact when the capacitance of the first electrode becomes smaller than another threshold value that is smaller than the threshold value.

The second electrode may be a grounded electrode.

The second electrode is may be made of a conductive material, and the conductive material may be a metal.

The conductive material may be a conductive rubber.

The conductive material may be a conductive resin.

The conductive resin may contain an embedded conductor.

The embedded conductor may be an embedded metal.

The first and second electrodes may be integrally formed with an insulating resin for a joint purpose by using extrusion molding.

In one preferred embodiment, a pinch prevention apparatus is provided including a detection apparatus that detects that two members, at least one of which is driven by a driver, pinch a foreign object and a control apparatus that controls the driver to prevent the pinch based on a pinch detection signal from the detection apparatus, the pinch prevention apparatus characterized in that the detection apparatus is an contact detection apparatus described above.

Advantage of the Invention

In the inventions according to claims 1 or 16, since the contact detection apparatus includes the first electrode made of a flexible conductive material and extending throughout a contact detection range, the second electrode apart from the first electrode and extending on the back side of the first electrode, and the detection means for detecting contact of an object with the first electrode based on the capacitance of the first electrode, a contact detection apparatus that allows faster detection and a pinch prevention apparatus equipped with such a detection apparatus are achieved.

When the first electrode is made of a conductive resin containing an embedded conductor, the isoelectric state of the first electrode can be enhanced.

When the embedded conductor is located at the base of the first electrode, the load exerted by the first electrode when it is deformed is small.

When the embedded conductor is an embedded metal, isoelectricity can be enhanced.

When the detection means detects the contact when the capacitance of the first electrode becomes greater than a predetermined threshold value, contact with the human body is easily detected.

When the second electrode has a capacitance greater than the threshold value, contact with an object having a low capacitance can be detected.

When the detection means also detects the contact with an object having a low capacitance when the capacitance of the first electrode becomes smaller than another threshold value that is smaller than the threshold value.

When the second electrode is a grounded electrode, the capacitance can be reduced when the second electrode comes into contact therewith.

When the second electrode is made of a conductive material, the second electrode is reliably grounded.

When the conductive material is a metal, isoelectricity can easily be achieved.

When the conductive material is a conductive rubber, the formation is easily carried out.

When the conductive material is a conductive resin, the formation is easily carried out.

When the conductive resin contains an embedded conductor, isoelectricity can easily be achieved.

When the embedded conductor is an embedded metal, isoelectricity can easily be achieved.

When the first and second electrodes are integrally formed with an insulating resin for a joint purpose by using extrusion molding, the integrated structure is easily handled.

Figure 1:
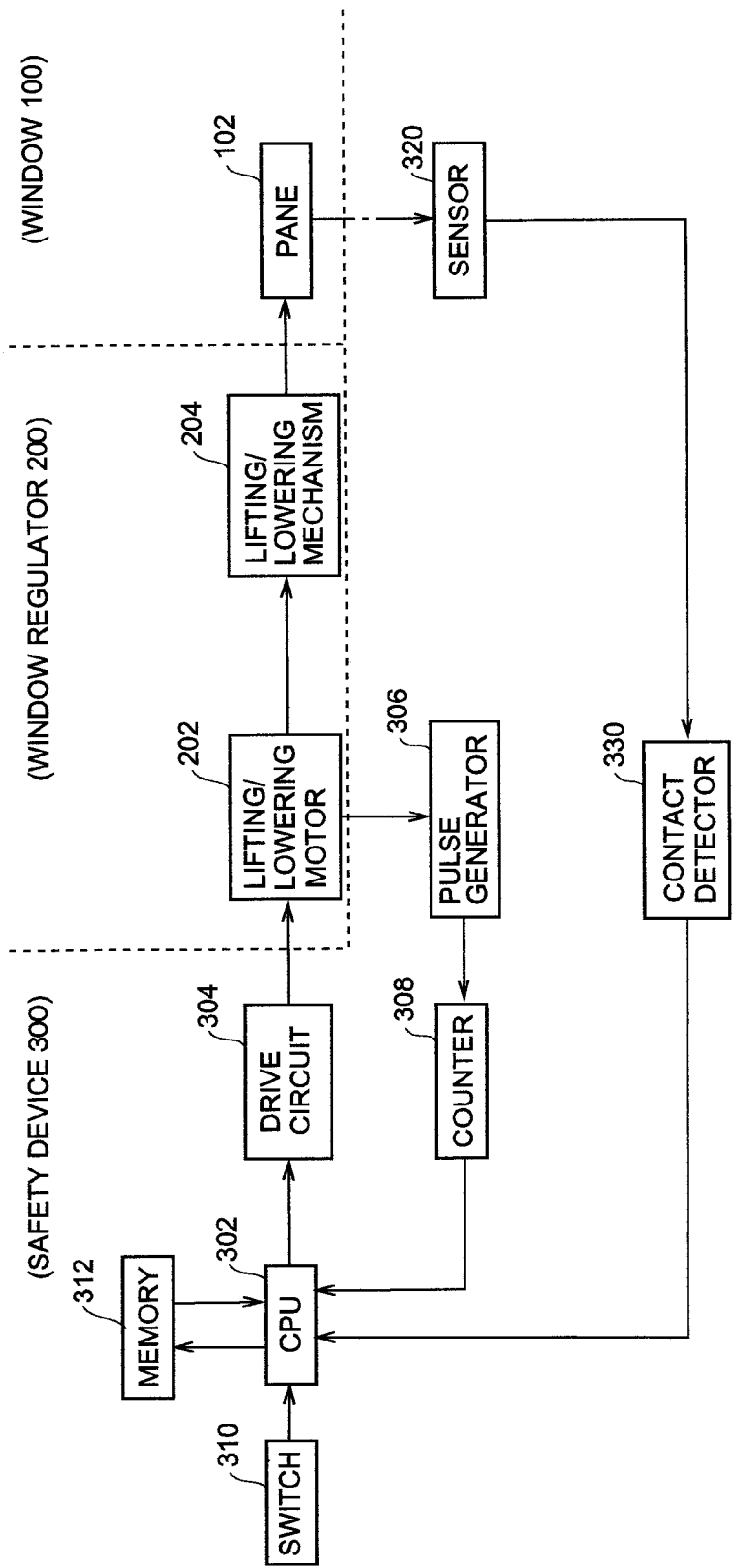
FIG. 1 is a block diagram of a power window using a contact detection apparatus and a pinch prevention apparatus that are examples of the best mode for carrying out the invention.

DESCRIPTION OF REFERENCE NUMERALS AND SIGNS 100 window
102 pane
104 window frame
104a upper frame
104b rear frame
104c front frame
110 door body
140 door sash
142 door guard
144 weatherstrip
200 window regulator
202 lifting/lowering motor
204 lifting/lowering mechanism
300 safety device
304 drive circuit
306 pulse generator
308 counter
310 switch
320 sensor
330 contact detector
430 outer electrode
432 embedded metal
440 inner electrode
442 embedded metal
450 joint member
452 coating

BEST MODE FOR CARRYING OUT THE INVENTION

The best mode for carrying out the invention will be described below in detail with reference to the drawings. The invention is not limited to the best mode for carrying out the invention. FIG. 1 is a block diagram showing an example of a power window. As shown in FIG. 1, the power window includes a window 100, a window regulator 200, and a safety device 300.

The window 100 includes a pane 102. The window regulator 200 includes a lifting/lowering motor 202 and a lifting/lowering mechanism 204. The lifting/lowering motor 202 drives the lifting/lowering mechanism 204 to lift and lower the pane 102. The safety device 300 manages the safety of the lifting/lowering operation of the pane 102 performed by the window regulator 200.

The safety device 300 is an example of the best mode for carrying out the invention. The configuration of the safety device 300 shows an example of the best mode for carrying out the invention concerning the pinch prevention apparatus.

The safety device 300 includes a CPU 302. The CPU 302 is the heart of the safety device 300 and performs the safety management of the window regulator 200 based on a predetermined program. The CPU 302 uses a drive circuit 304 to control the lifting/lowering motor 202. The amount of rotation of the lifting/lowering motor 202 is fed back to the CPU 302 via a pulse generator 306 and a counter 308. The CPU 302 recognizes the position of the pane based on the count obtained in the counter 308.

A vehicle having a plurality of power windows includes a plurality of sets of the window 100 and the window regulator 200, and a plurality of sets of the pulse generator 306, the counter 308, a sensor 320, and a contact detector 330 are provided accordingly. FIG. 1 shows only one of the plurality of sets. The CPU 302 manages the safety of the lifting/lowering operation of the pane 102 for each set of the window and the window regulator.

The CPU 302 receives a pane lifting/lowering command via a switch 310. The switch 310 is operated by a user. The switch 310 includes a plurality of switches corresponding to the plurality of windows. These switches are collectively provided in an area close to the driver's seat, so that any of the plurality of windows can be opened and closed from the driver's seat.

The sensor 320 is provided in the window 100. The output signal from the sensor 320 is inputted to the contact detector 330. The contact detector 330 judges whether or not contact with an object occurs based on the output signal from the sensor 320 and inputs a judgment signal to the CPU 302. The CPU 302 controls the window regulator 200 based on the input signal from the contact detector 330.

The portion formed of the sensor 320 and the contact detector 330 is an example of the best mode for carrying out the invention. The configuration of this portion shows an example of the best mode for carrying out the invention concerning the contact detection apparatus. The contact detector 330 is an example of the detection means in the invention.

Figure 2:
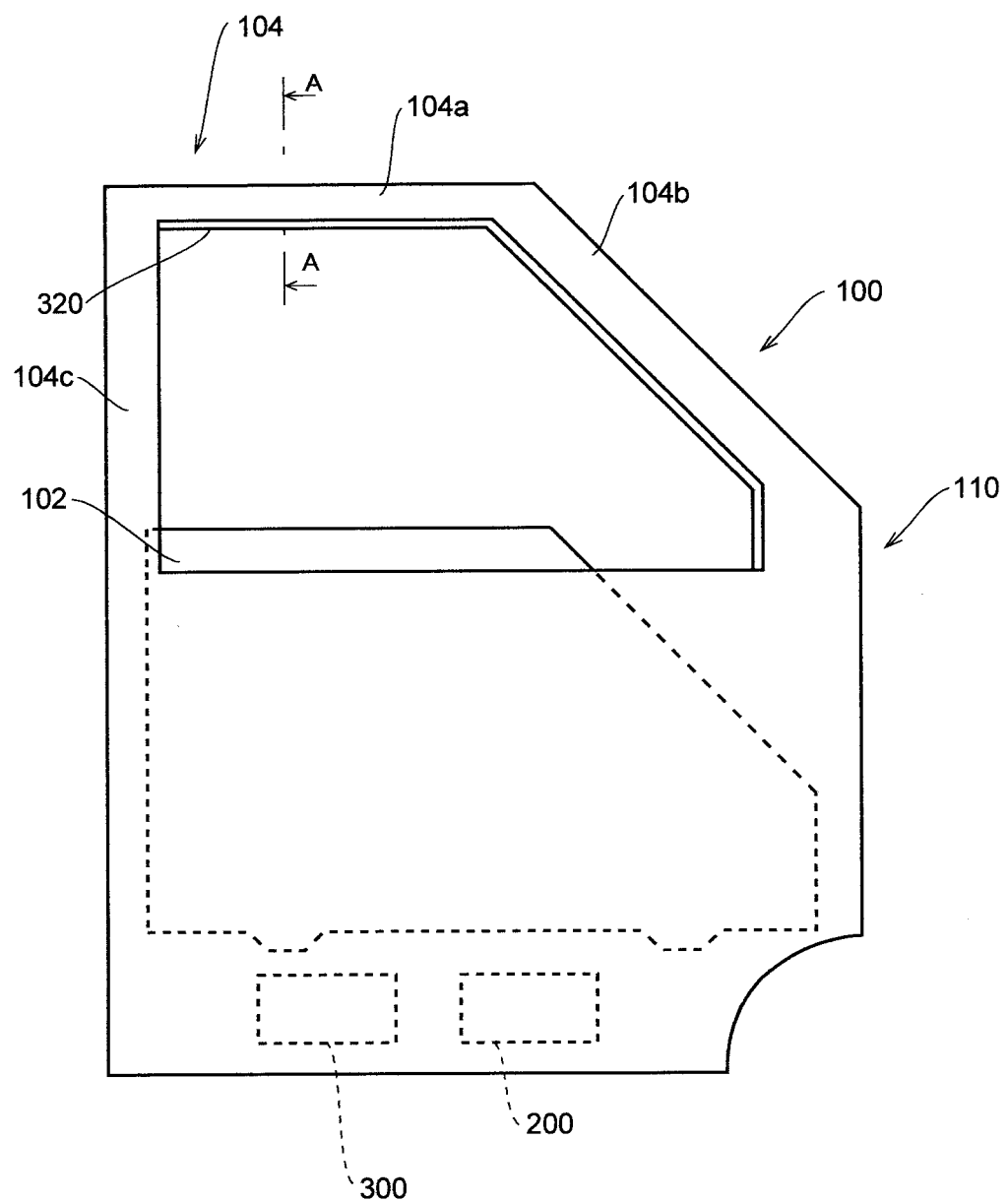
FIG. 2 shows the configuration of the power window using the contact detection apparatus and the pinch prevention apparatus that are examples of the best mode for carrying out the invention.

FIG. 2 shows an example of a vehicle door equipped with such a power window. Although a rear door of a sedan is shown herein by way of example, each of the other doors basically has similar configuration. In the vehicle door, the upper portion of a door body 110 is the window 100. The window 100 has a structure in which the pane 102, which is lifted out of and lowered into the door body 110, closes and opens the opening of a window frame 104. The window regulator 200, which lifts and lowers the pane 102, and the safety device 300 of the window regulator 200 are disposed in the door body 110.

The window frame 104 includes an upper frame 104a, a rear frame 104b, and a front frame 104c. The upper frame 104a is roughly horizontal. The rear frame 104b is inclined roughly rearward and downward. The front frame 104c is roughly vertical. The sensor 302 is disposed along the upper frame 104a and the rear frame 104b.

Figure 3:
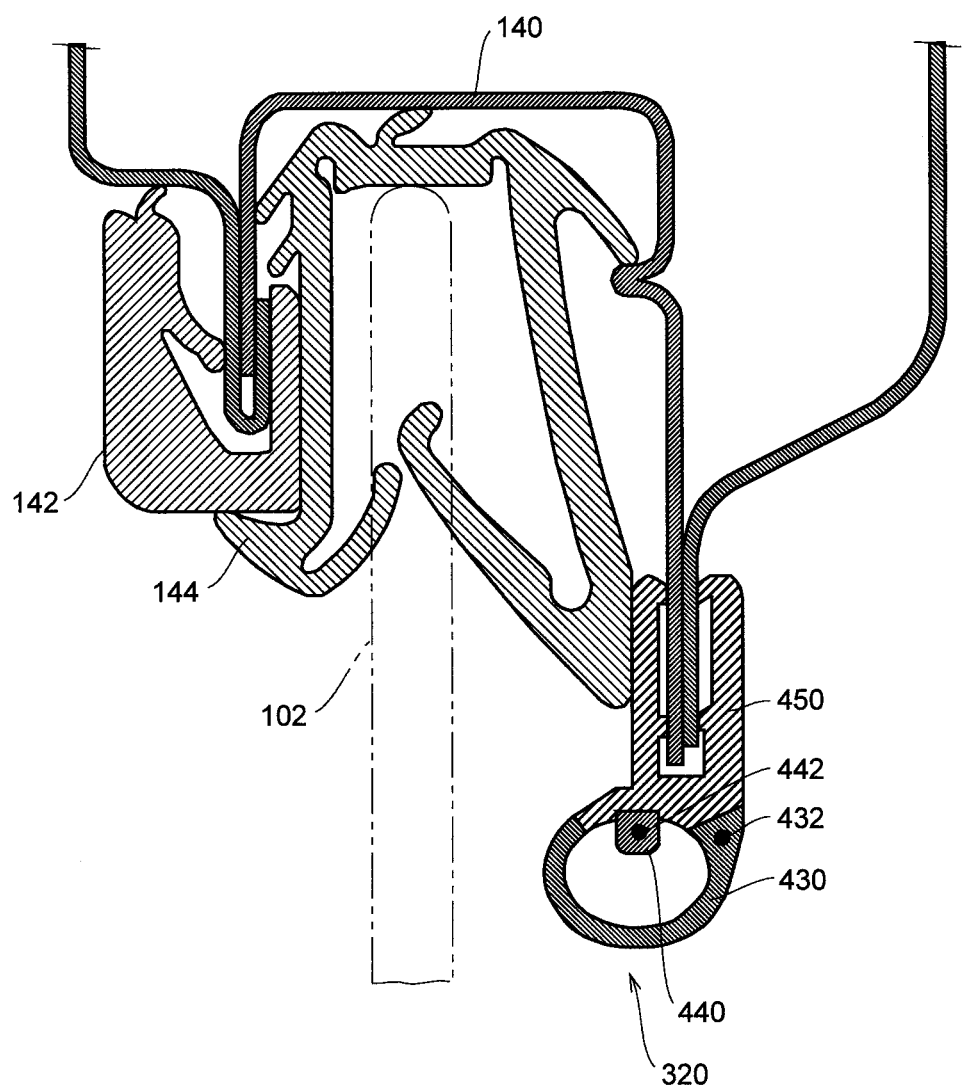
FIG. 3 shows how a sensor is attached to a window.

FIG. 3 shows how the sensor 320 is attached to the window 100. FIG. 3 corresponds to the cross-sectional view taken along the line A-A shown in FIG. 2. As shown in FIG. 3, the sensor 320 is disposed on the interior side of a door sash 140 and oriented downward. A door guard 142 is provided on the exterior side of the door sash 140. A weatherstrip 144 is provided at the portion that receives the upper end of the pane 102.

The sensor 320 includes an outer electrode 430 and an inner electrode 440 integrally formed via a joint member 450 therebetween. The outer electrode 430 is an example of the first electrode in the invention. The inner electrode 440 is an example of the second electrode in the invention. The joint member 450 is, for example, made of insulating resin, such as thermoplastic olefin elastomer (TPO). The sensor 320 is attached to the door sash 140 by using the U-shaped portion of the joint member 450.

The outer electrode 430 and the joint member 450 form a tubular structure, and the inner electrode 440 is supported by the joint member 450 at the upper center of the inner wall of the tubular structure. The inner electrode 440 is as long as the external electrode 430. In this text, the outer-wall side of the tubular structure is also referred to as the front side, and the inner-wall side is also referred to as the back side. The inner electrode 440 is therefore located on the back side of the outer electrode.

The outer electrode 430 is made of a flexible conductive material. Examples of such a material are conductive rubber and conductive resin. An example of conductive resin is carbon-containing TPO.

The outer electrode 430 includes an embedded metal 432 in its base, that is, in the vicinity of the portion where the outer electrode 430 is connected to the joint member 450. The embedded metal 432 is a wire made of stainless steel or copper extending entirely along the outer electrode 430. Having the embedded metal 432, the outer electrode 430 has the same potential throughout its length. The embedded metal 432 may be replaced with a conductor other than a metal. Examples of such a conductor may be conductive resin and conductive rubber with particularly enhanced conductivity.

The outer electrode 430 is connected to the contact detector 330 through a signal line. The contact detector 330 detects whether or not the outer electrode 430 comes into contact with the human body based on the capacitance of the outer electrode 430. The detection whether or not there is contact is carried out with reference to a predetermined threshold value.

The inner electrode 440 is also made of a conductive material. An example of such a material is conductive resin. The inner electrode 440 includes an embedded metal 442. The embedded metal 442 is a wire made of stainless steel or copper extending entirely along the outer electrode 440. The embedded metal 442 may be replaced with a conductor other than a metal. Examples of such a conductor may be conductive resin and conductive rubber with particularly enhanced conductivity.

Having the embedded metal 442, the inner electrode 440 has the same potential throughout its length. The embedded metal 442 can be omitted. The inner electrode 440 is connected to the door sash 140. The inner electrode 440 may be connected to the ground of the electric system that forms the safety device 300. In this case, the inner electrode 440 becomes a ground electrode.

The thus configured sensor 320 is integrally molded, for example, by using extrusion molding. In this way, the sensor 320 formed of the outer electrode 430, the inner electrode 440, and the joint member 450 can be easily manufactured.

Figure 4:
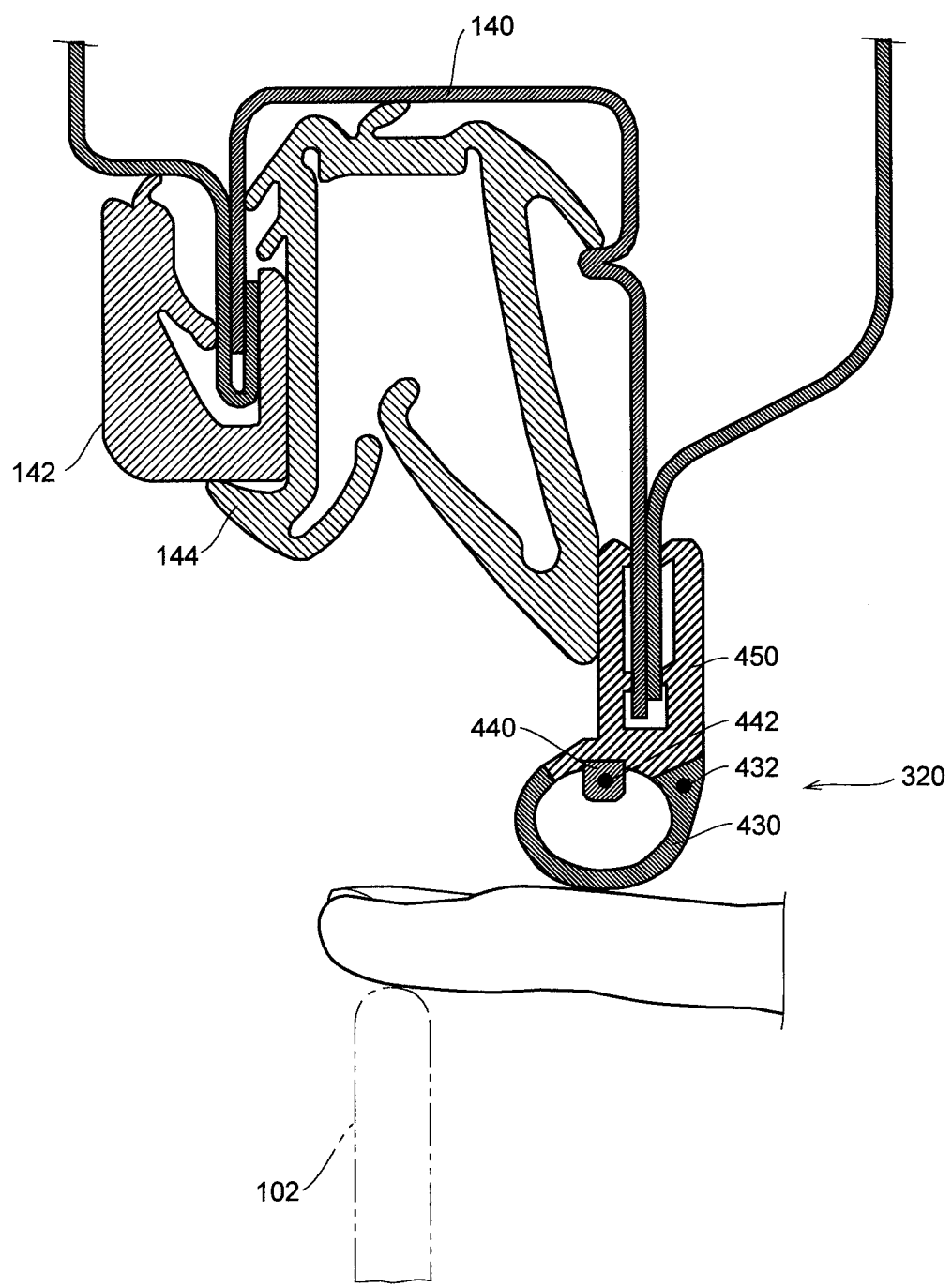
FIG. 4 shows a state in which the human body is pinched.

FIG. 4 shows the state in which the human body (the hand, for example) is pinched. As shown in FIG. 4, when the hand is pinched between the pane 102 and the sensor 320, the capacitance of the human body increases the capacitance of the outer electrode 430.

The contact detector 330 detects the pinching based on the increase in capacitance. A pinch detection signal is inputted to the CPU 302. The CPU 302 controls the drive circuit 304 to lower the pane 102 based on the pinch detection signal.

The pinch prevention operation is initiated as soon as the human body comes into contact with the sensor 320 without any delay. Further, since the outer electrode 430 of the sensor 320 is flexible, no large force is exerted on the pinched human body.

When an object having a low capacitance is pinched, the capacitance of the outer electrode 430 may not become greater than the threshold value in some cases. Such a situation occurs, for example, when the hand wearing a glove is pinched. In this case, the contact between such an object and the sensor 320 alone will not initiate the pinch prevention operation.

Figure 5:
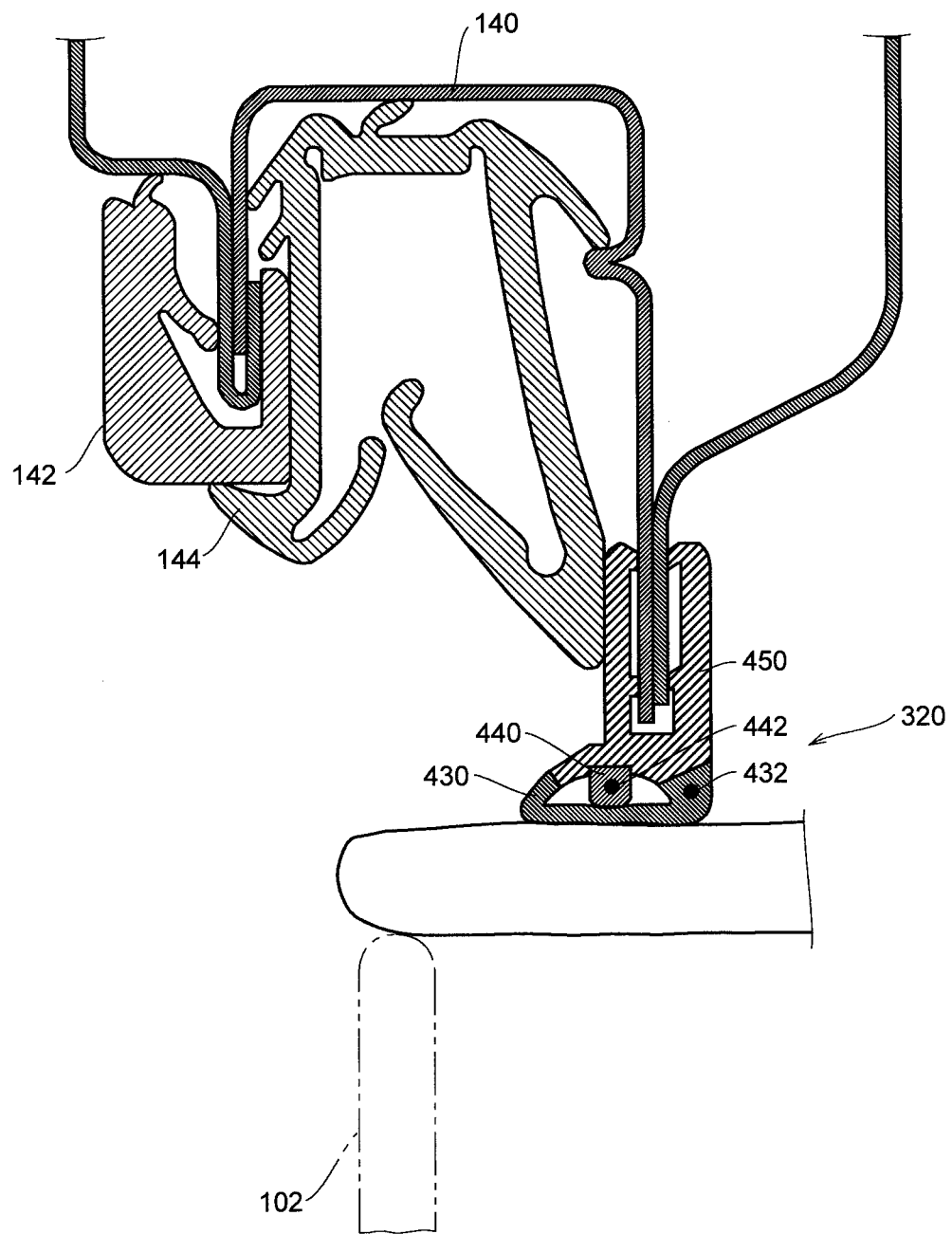
FIG. 5 shows a state in which the human body is pinched.

Instead, the pane 102 keeps rising with the object pinched, and the outer electrode 430 is crushed and comes into contact with the inner electrode 440, as shown in FIG. 5. That is, the outer electrode 430 and the inner electrode 440 form a short circuit. Since the inner electrode 440 is a ground electrode, the contact therewith instantly reduces (remove) the capacitance of the outer electrode 430.

The contact detector 330 also judges that contact occurs when the capacitance is instantly reduced (removed). The contact detection in response to instant reduction (removal) in capacitance is based on another threshold value. The threshold value is smaller than that used for detecting increase in capacitance.

Based on the contact detection using these threshold values, the pinch prevention operation is carried out under the control of the CPU 302. In this way, even when an object having a low capacitance is pinched, the pinch prevention operation can be reliably carried out.

The inner electrode 440 is not necessarily be a ground electrode but may be an electrode having a high capacitance. In this case, the capacitance of the outer electrode 430 will become greater than the threshold value when it comes into contact with the inner electrode 440, allowing detection of contact with an object. When the inner electrode 440 has a capacitance, the embedded metal 442 may be omitted.

Figure 6:
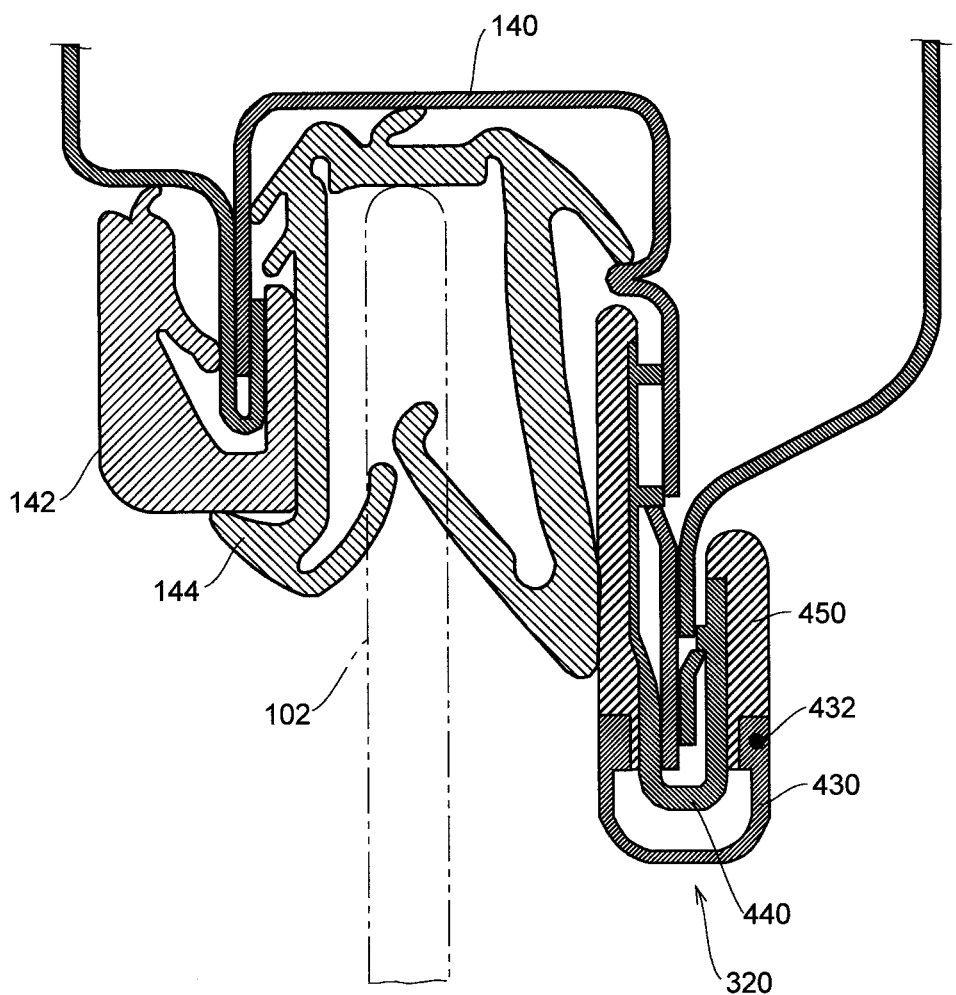
FIG. 6 shows an example of the configuration of the sensor.

FIGS. 6 to 15 and FIGS. 17-19 show various examples of the configuration of the sensor 320. In the figures, portions similar to those shown in FIG. 3 have the same reference numerals. In FIG. 6, the conductive resin that forms the inner electrode 440 extends into the U-shaped portion of the joint member 450, and the extended portion keeps electrical contact with the door sash 140.

Figure 7:
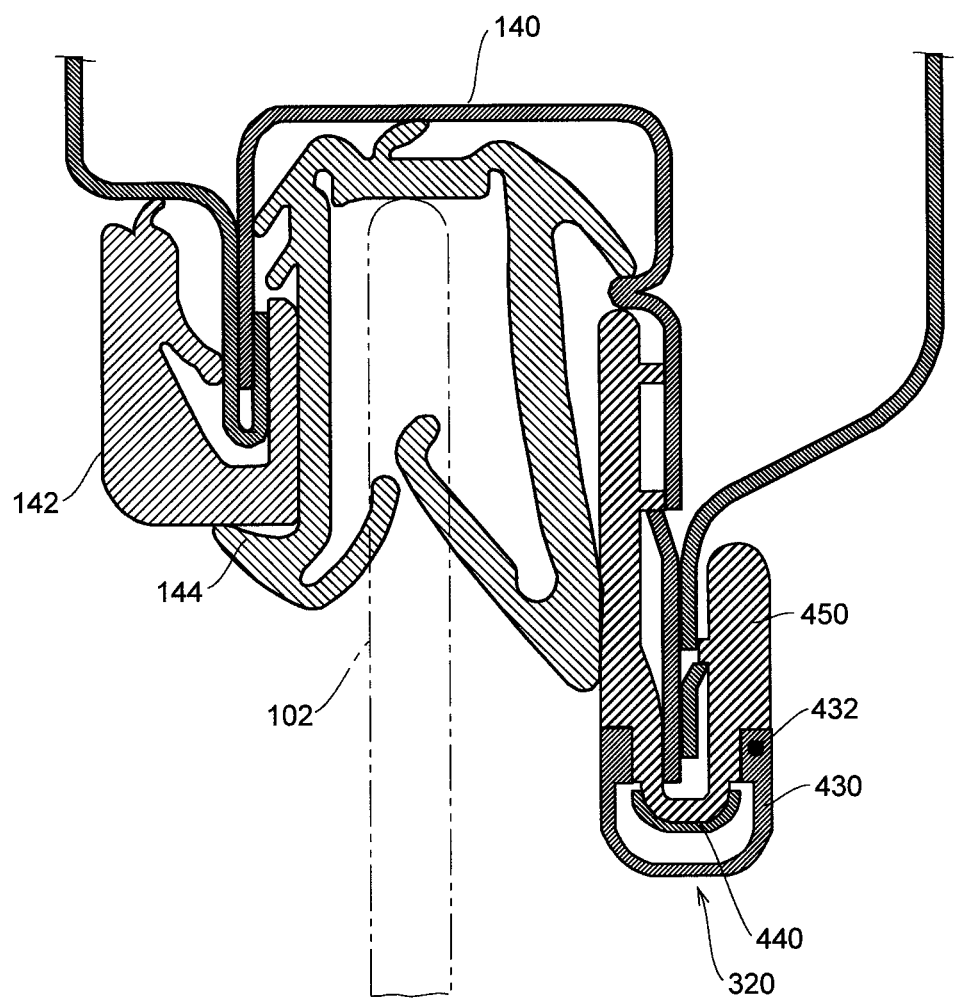
FIG. 7 shows an example of the configuration of the sensor.
Figure 8:
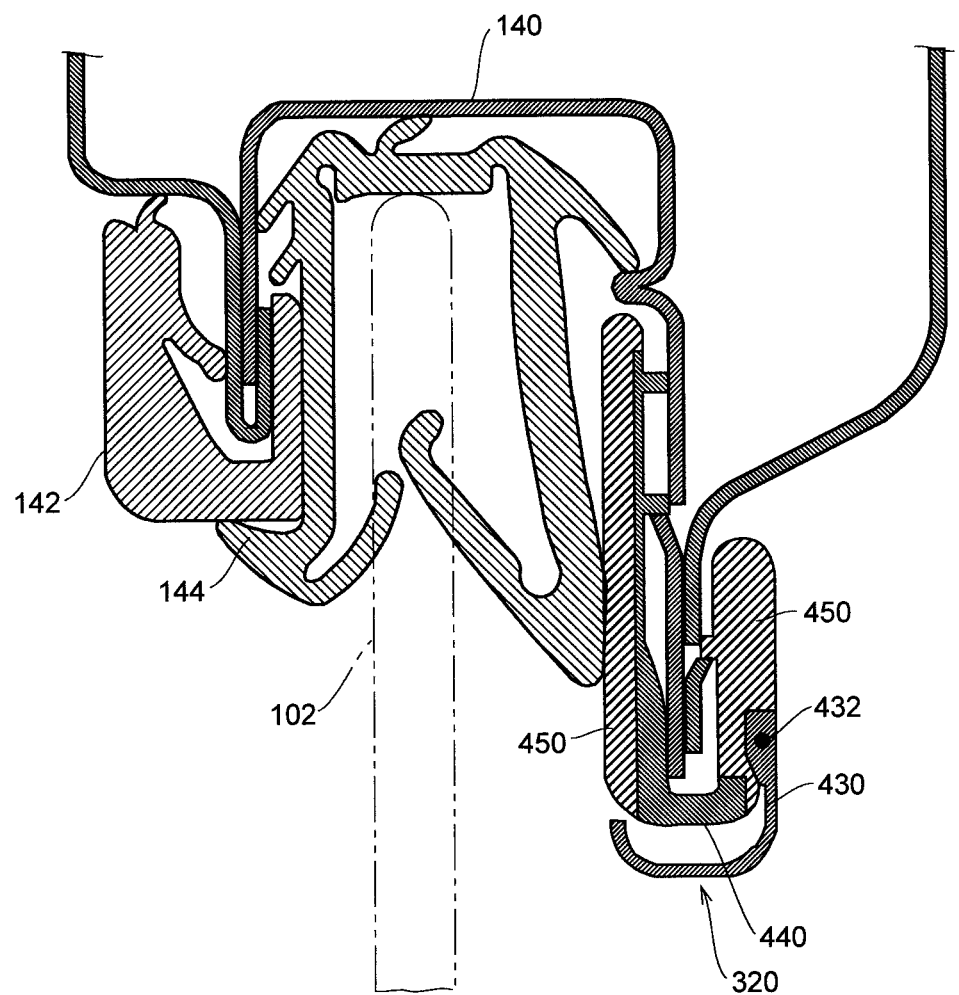
FIG. 8 shows an example of the configuration of the sensor.

In FIG. 7, a metal electrode is used as the inner electrode 440. The use of a metal electrode significantly enhances the isoelectric state of the entire inner electrode 440. In FIG. 8, the inner electrode 440 is electrically connected to the door sash 140, and one side of the outer electrode 430 is apart from the joint member 450.

Figure 9:
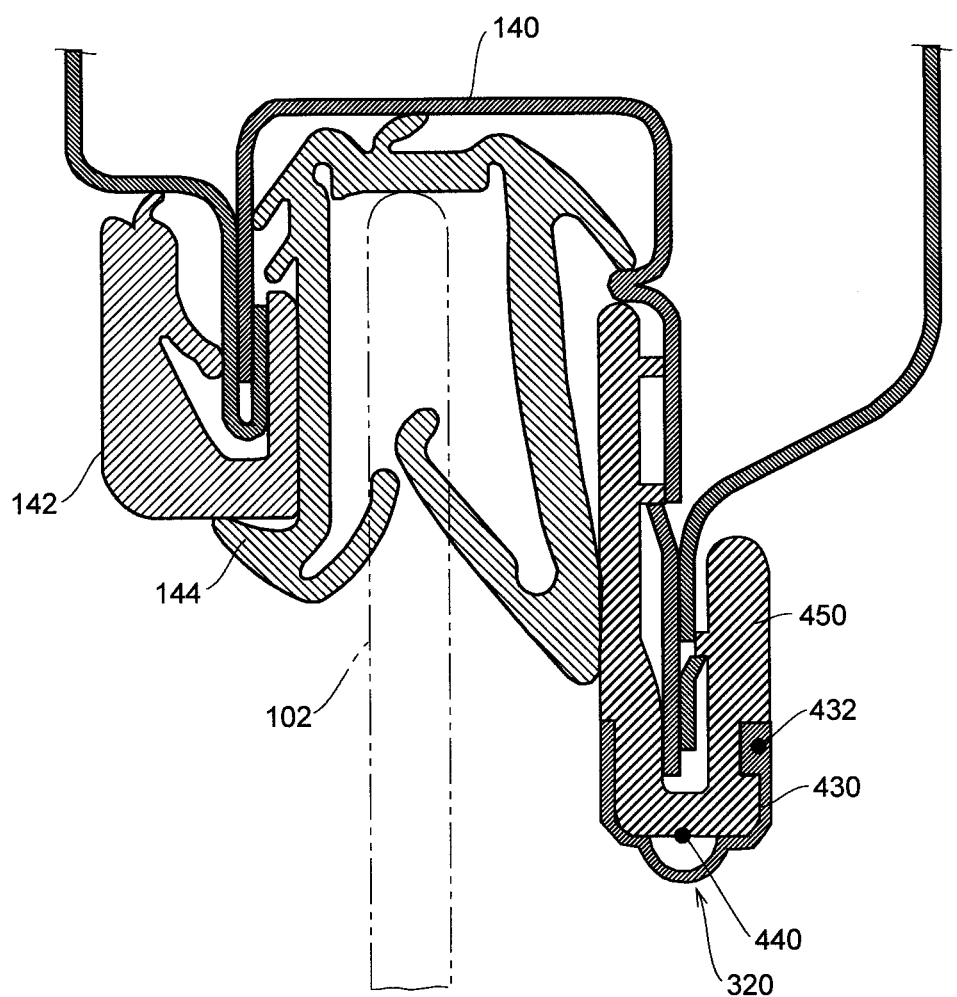
FIG. 9 shows an example of the configuration of the sensor.
Figure 10:
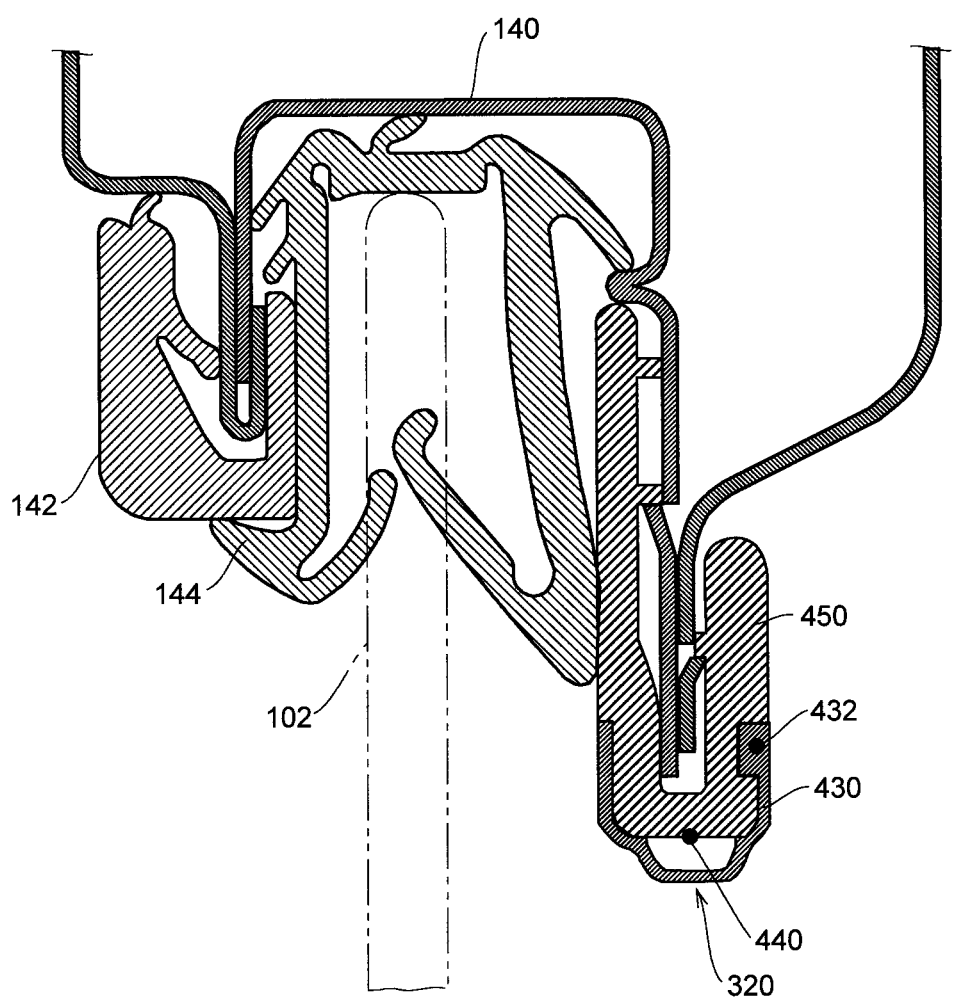
FIG. 10 shows an example of the configuration of the sensor.

In FIG. 9, the inner electrode 440 is formed of only a metal wire, and the hemispherical outer electrode 430 surrounds the inner electrode 440. In FIG. 10, the half-elliptical outer electrode 430 surrounds the inner electrode 440, which is a metal wire.

Figure 11:
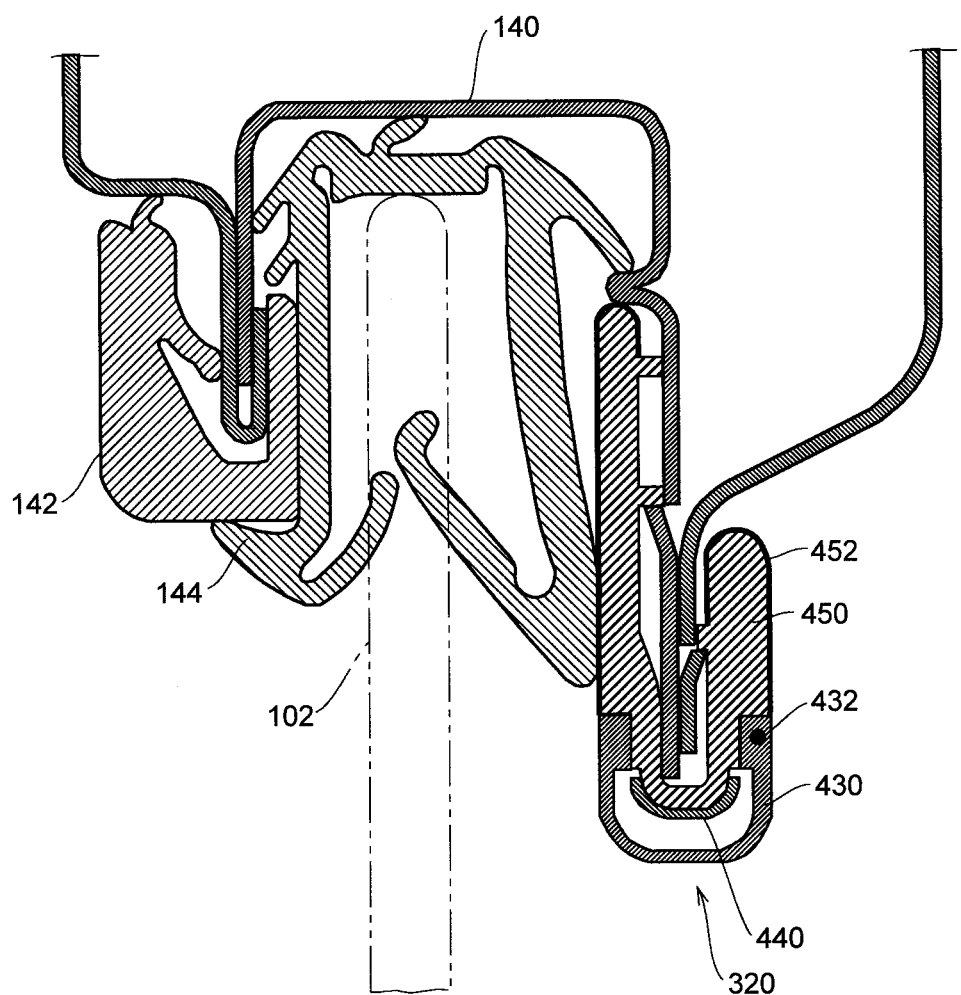
FIG. 11 shows an example of the configuration of the sensor.
Figure 12:
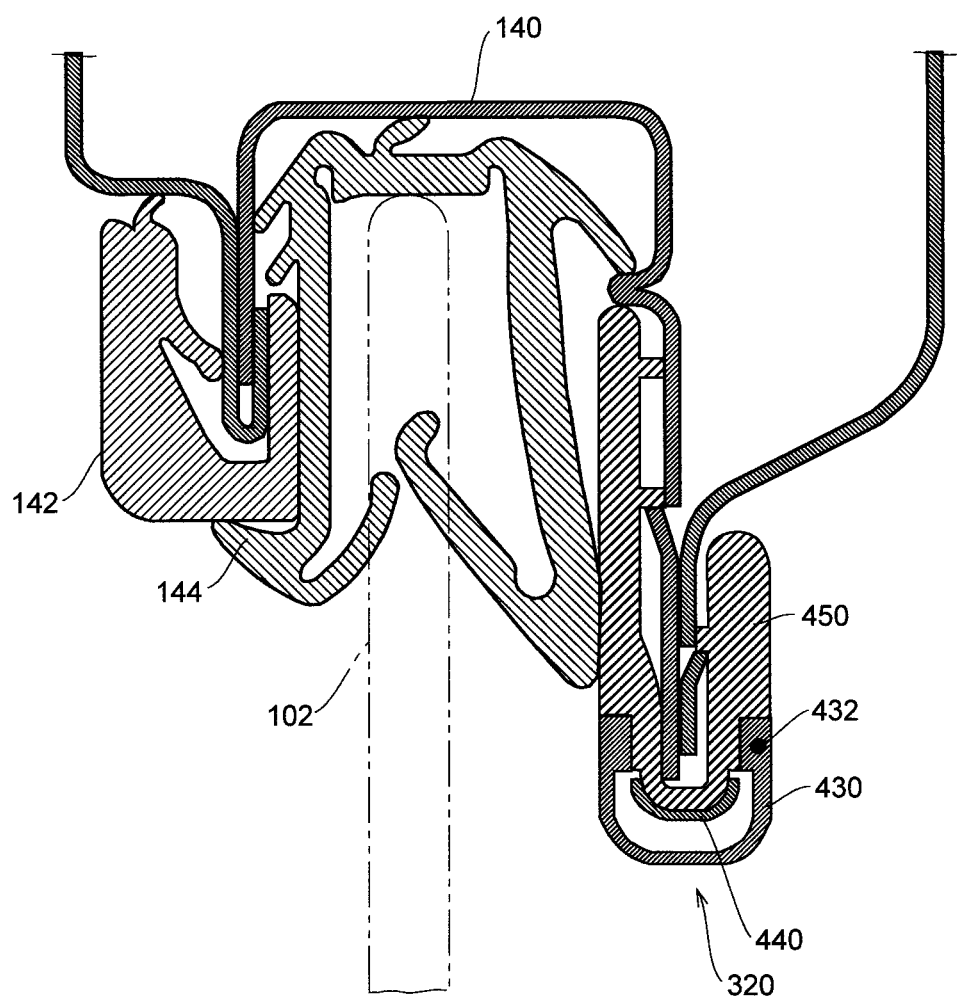
FIG. 12 shows an example of the configuration of the sensor.

FIG. 11 shows an example of the inner electrode 440 having a capacitance. The inner electrode 440 is made of a resin material and includes no embedded metal. Further, the body of the joint member 450 is made of a polypropylene (PP) resin, and the surface thereof is coated with a TPO resin. The outer appearance of the joint member 450 is thus the same as that of the joint member 450 made of a TPO resin. In FIG. 12, the joint member 450 is made of a TPO resin, so that the surface coating is unnecessary.

Figure 13:
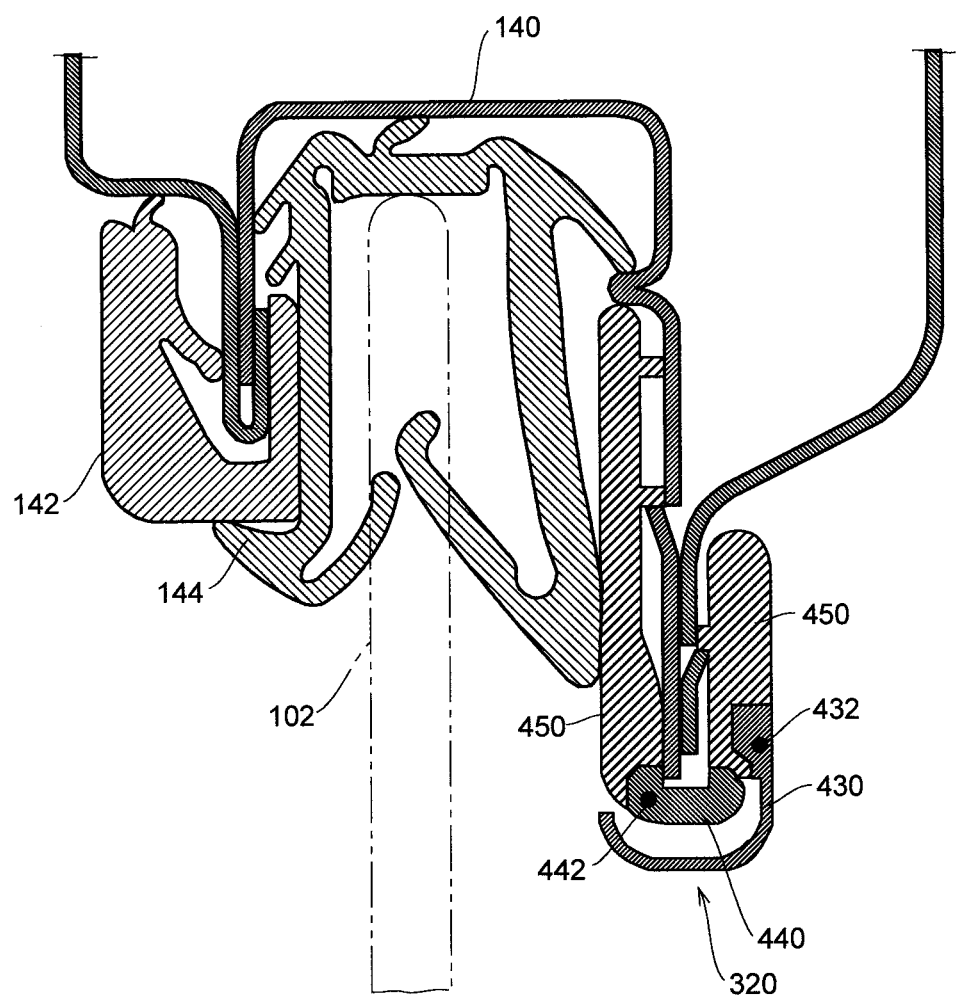
FIG. 13 shows an example of the configuration of the sensor.
Figure 14:
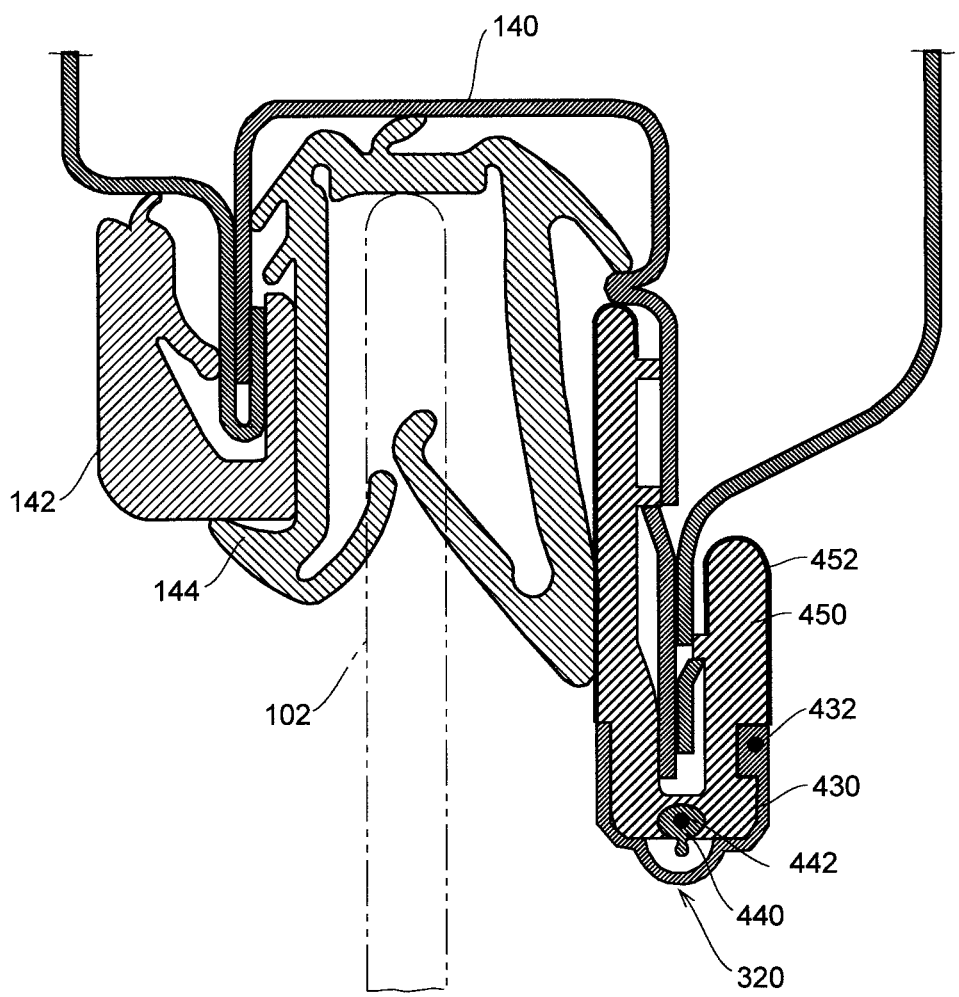
FIG. 14 shows an example of the configuration of the sensor.

FIG. 13 shows a structure in which the inner electrode 440 includes an embedded metal and one side of the outer electrode 430 is apart from the joint member 450. In FIG. 14, the most part of the inner electrode 440 including an embedded metal is buried in the joint member 450, and only a protrusion of the inner electrode 440 is exposed. The hemispherical outer electrode 430 surrounds the protrusion. The body of the joint member 450 is made of a PP resin and a coating 452 made of a TPO resin is provided.

Figure 15:
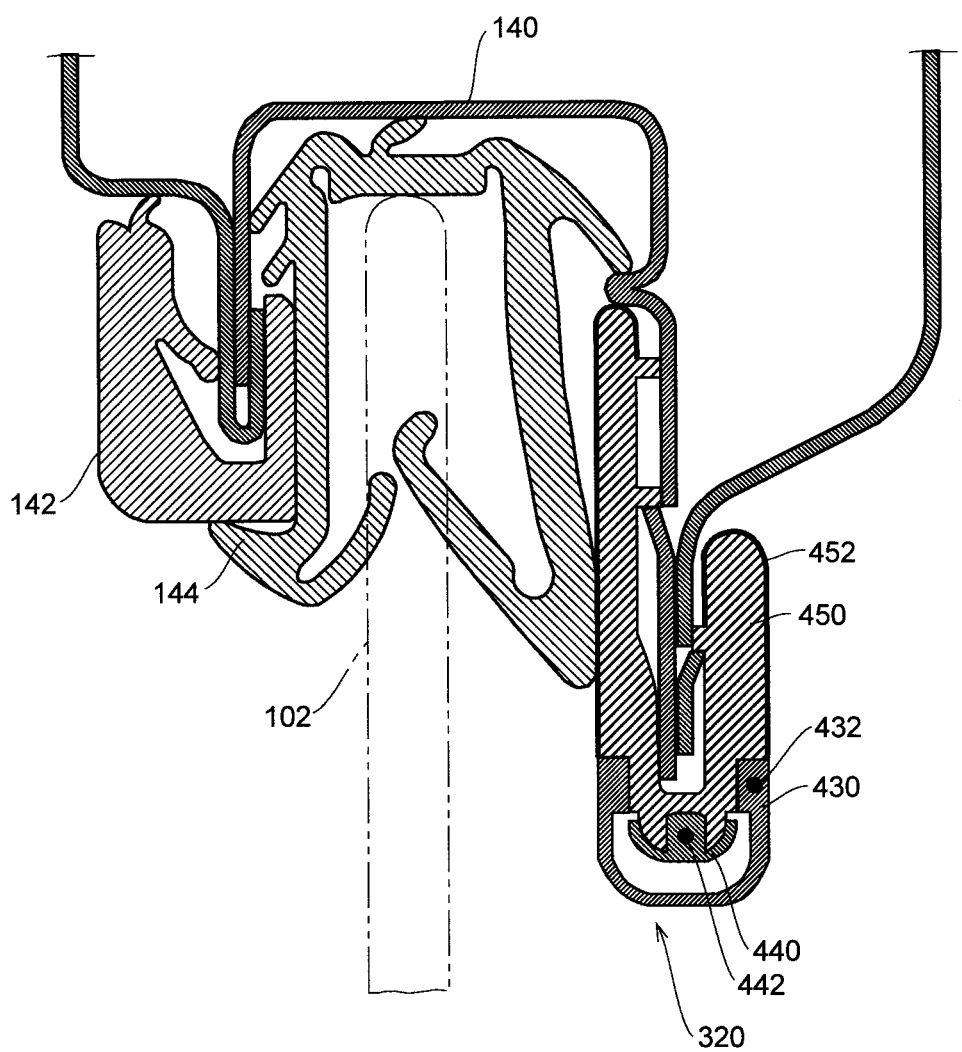
FIG. 15 shows an example of the configuration of the sensor.

FIG. 15 shows a structure in which the metal embedded portion of the inner electrode 440 is buried in the joint member 450 and the other portion of the inner electrode 440 is spread over the end surface of the joint member 450. The body of the joint member 450 is made of a PP resin, and a TPO coating is provided.

Figure 17:
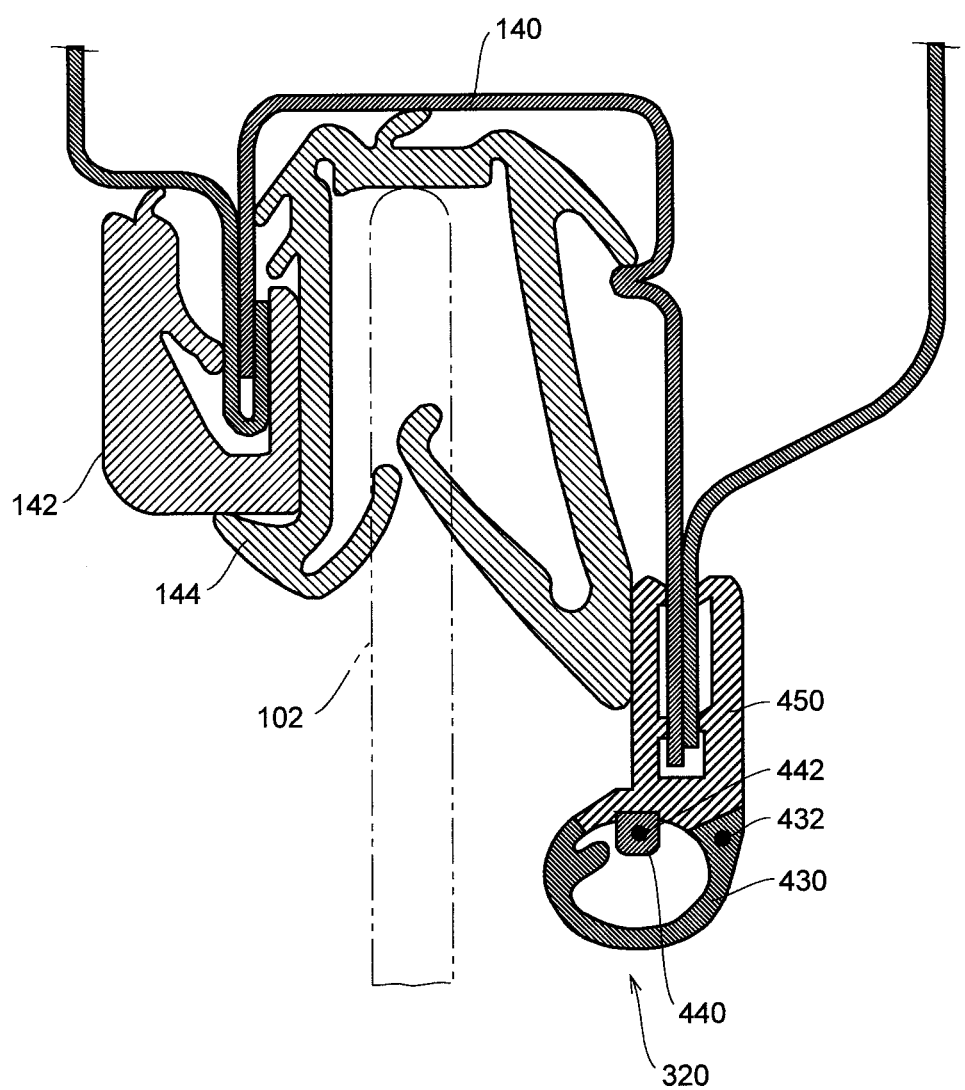
FIG. 17 shows an example of the configuration of the sensor.
Figure 18:
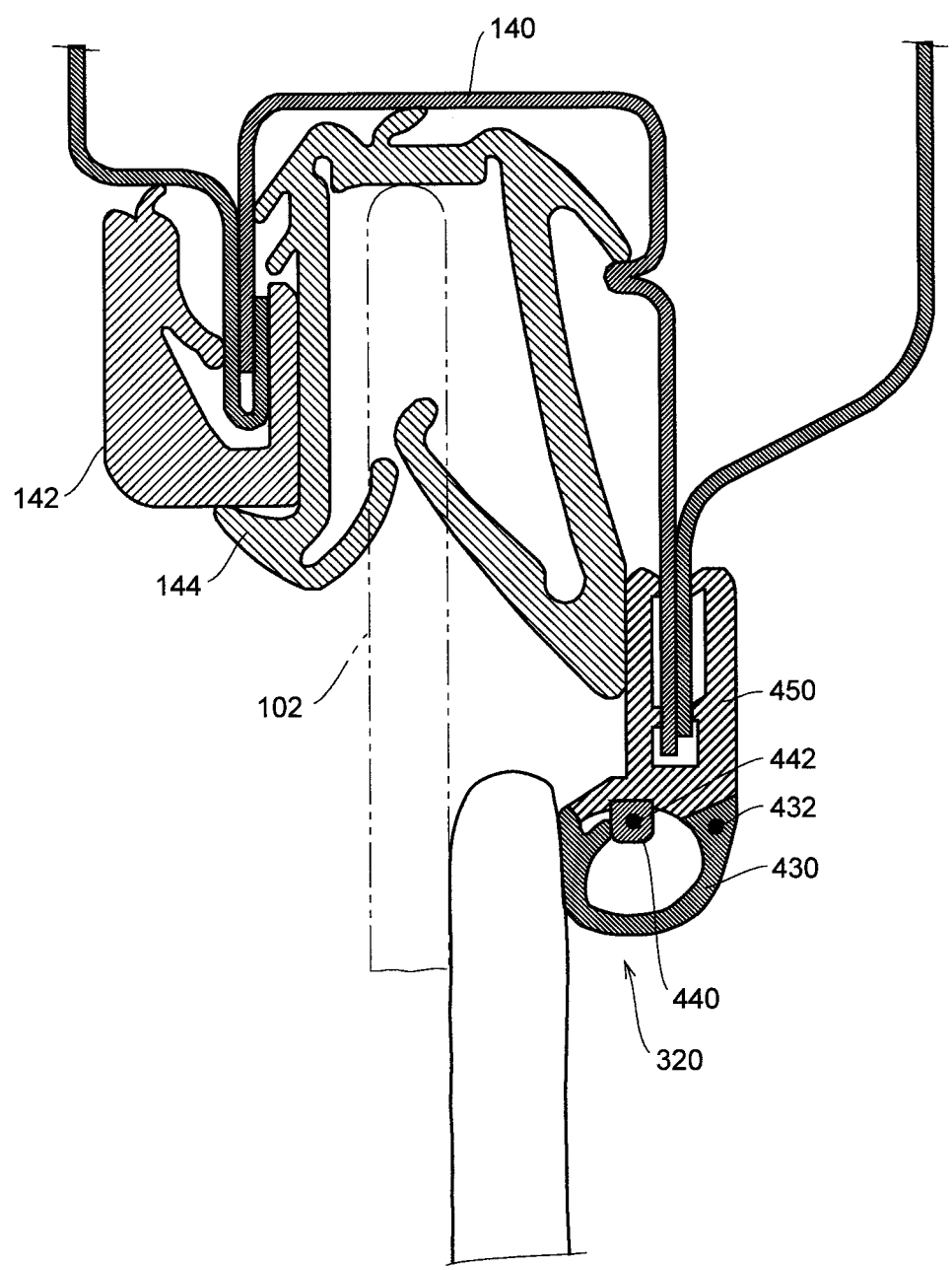
FIG. 18 shows a state in which the human body is pinched.

In FIG. 17, part of the inner wall of the outer electrode 430 protrudes toward the inner electrode 440. Therefore, as shown in FIG. 18, when an object is pinched between the side of the outer electrode 430 and the side of the pane 102, the protrusion of the outer electrode 430 will come into contact with the inner electrode 440, so that the pinching can be detected.

Figure 19:
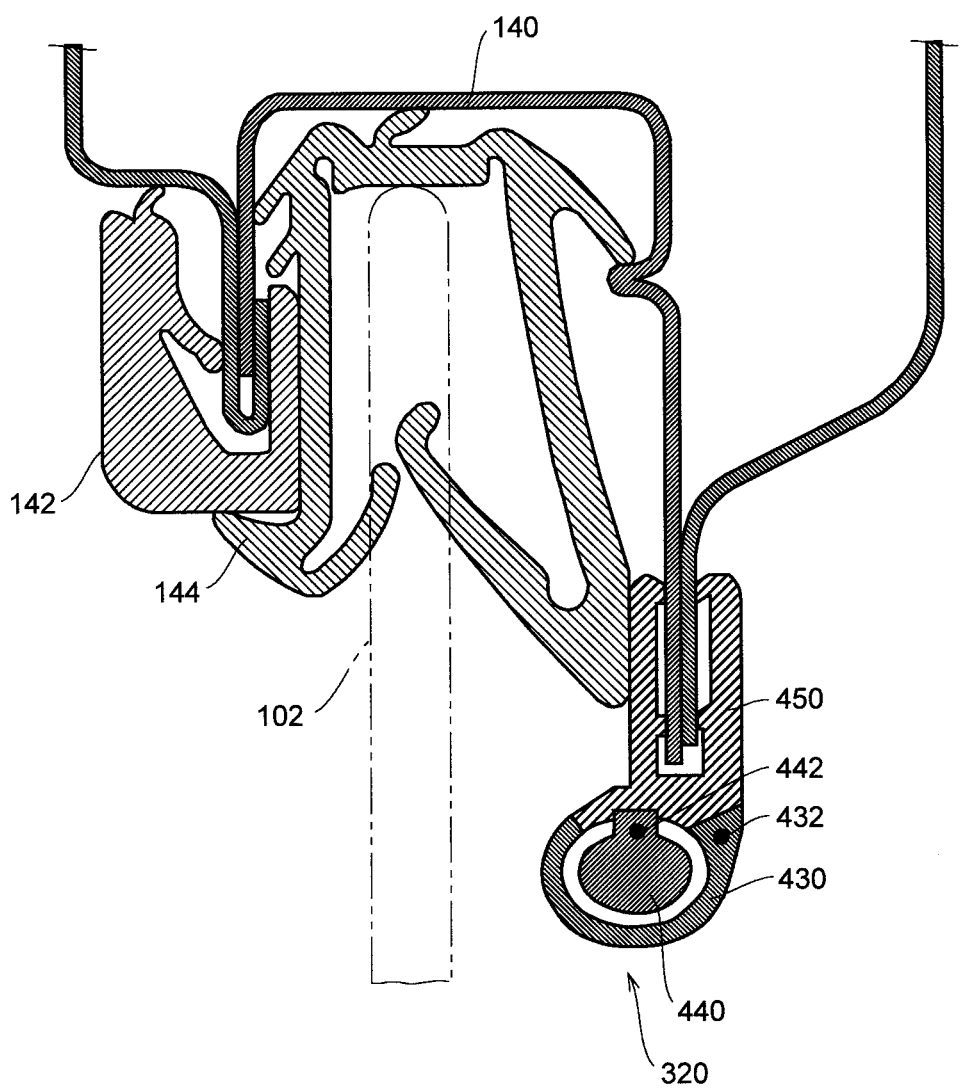
FIG. 19 shows an example of the configuration of the sensor.

In FIG. 19, the inner electrode 440 is a concentric cylindrical structure inside the outer electrode 430 and faces the outer electrode 430 with a gap therebetween. With such a configuration as well, an object pinched between the side of the outer electrode 430 and the side of the pane 102 can be detected.

Figure 16:
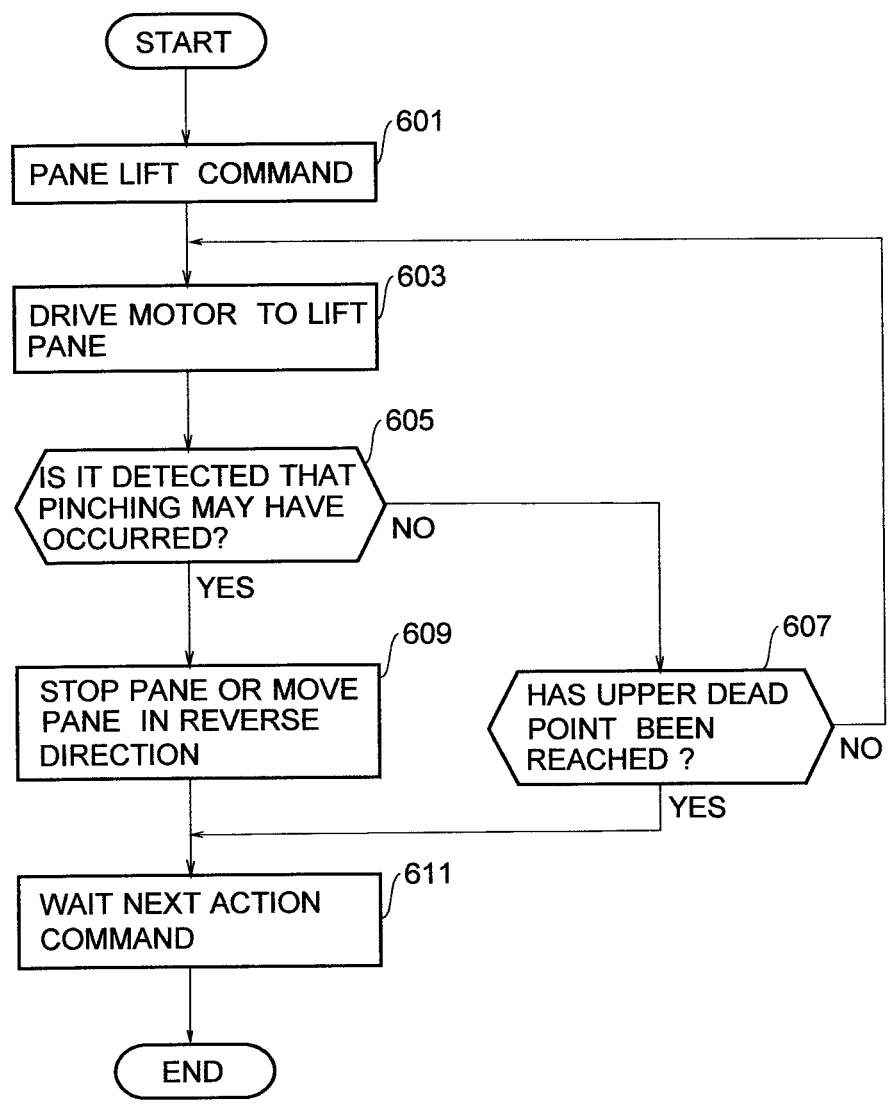
FIG. 16 is a flowchart of a pinch prevention operation.

The operation of the present apparatus will now be described. FIG. 16 shows a flowchart of the operation of the apparatus. The operation is carried out under the control of the CPU 302. When a command to lift the pane is issued in the step 601, the motor is driven to lift the pane in the step 603.

It is judged in the step 605 whether or not pinching may have occurred. When it is detected that no pinching may occur, it is judged in the step 607 whether or not the pane has reached the dead point. When the pane has not reached the dead point, the process returns to the step 603. Until it is detected that pinching may occur or the pane has reached the dead point, the operations described in the steps 603 to 607 are repeated. During these operations, the pane keeps rising. When it is detected that no pinching may occur but the pane has reached the dead point, the process proceeds to the step 611 and waits a command of the next action.

When it is judged in the step 605 that it is detected that pinching may occur, the pane is stopped or moved in the reverse direction in the step 609. The detection that pinching may occur is based on the detection by the sensor 320 that contact with the human body or the like has occurred, as shown in FIG. 4 or 5.

When the object that has come into contact is, for example, a bare hand, the contact is detected as shown in FIG. 4 and the pane is moved in the reverse direction from the state of contact. When the object that has come into contact is, for example, the hand wearing a glove, the contact is detected as shown in FIG. 5 and the pane is moved in the reverse direction from the state of contact.

While the above example has been described with reference to a power window for a vehicle, the power window is not limited thereto, but may be any power window as long as it uses a window regulator to drive the pane. While the above description has been made with reference to a power window that lifts the pane to close the window frame, the power window to be used may lower the pane to close the window frame. Alternatively, the power window may move the pane in the horizontal direction or in an oblique direction to close the window frame. Further, a power window is not necessarily used, but a power-driven sunroof, sliding door, back door, a pivoted door, or the like may be used.

The invention claimed is:

1. A contact detection apparatus comprising:
    a door body;
    a first electrode made of a flexible conductive material and extending throughout a contact detection range;
    a second electrode apart from the first electrode and extending on a back side of the first electrode, the second electrode being directly electrically connected to the door body;
    a joint member made of an insulating material and connecting the first electrode and the second electrode to form a tubular structure with the second electrode being inside the tubular structure; and
    a detector that detects direct contact of an object with the first electrode based on a capacitance of the first electrode;
    wherein:
    the first electrode comprises a projection inwardly extending from the interior of the first electrode toward the second electrode and an embedded conductor extending along a length of the first electrode, the extending projection being disposed independently from the embedded conductor; and
    the first electrode is exposed to direct exterior contact in both a first direction opposite the second electrode and a second direction crossing the first direction, the first electrode being in direct physical contact with the second electrode when pushed in the first direction and the projection of the first electrode being in direct physical contact with the second electrode when pushed in the second direction.

2. The contact detection apparatus according to claim 1, wherein the second electrode is made of a conductive resin and does not contain an embedded conductor.

3. The contact detection apparatus according to claim 1, wherein, as viewed from a cross section of the tubular structure, the first electrode includes two end portions connected to the joint member and the embedded conductor is disposed in one of the end portions.

4. A contact detection apparatus comprising:
    a first electrode made of a flexible conductive material with a partially incomplete circular cross section and extending throughout a contact detection range, the first electrode comprising a projection inwardly extending from the interior of the first electrode toward the second electrode and an embedded conductor extending along a length of the first electrode, the extending projection being disposed independently from the embedded conductor;

a second electrode apart from the first electrode and extending on a back side of the first electrode in the vicinity of the incomplete circular cross section of the first electrode;

a joint member made of an insulating material positioned to close the incomplete circular cross section of the first electrode and thereby connecting the first electrode and the second electrode to form a tubular structure with the second electrode being inside the tubular structure; and a detector that detects direct contact of an object with the first electrode based on a capacitance change of the first electrode, wherein the first electrode is exposed to direct exterior contact in both a first direction opposite the second electrode and a second direction crossing the first direction, the first electrode being in direct physical contact with the second electrode when pushed in the first direction and the projection of the first electrode being in direct physical contact with between the first and second electrode when pushed in the second direction.

5. The contact detection apparatus according to claim 3, wherein the end portions have a width larger than a width at the middle portion between the end portions of the first electrode.

6. The contact detection apparatus according to claim 4, wherein a length of the extending projection is greater than a diameter of the embedded conductor.

* * * * *